United States Patent
Brooks et al.

(10) Patent No.: US 8,912,721 B2
(45) Date of Patent: *Dec. 16, 2014

(54) EXCLUSIVE OR (XOR) LAMP DRIVER AND LAMP

(75) Inventors: Timothy W. Brooks, Madison, IN (US); Peter H. Thompson, Madison, IN (US); Darren L. Harmon, Madison, IN (US)

(73) Assignee: Grote Industries, Inc., Madison, IN (US)

(*) Notice: Subject to any disclaimer, the term of this patent is extended or adjusted under 35 U.S.C. 154(b) by 240 days.

This patent is subject to a terminal disclaimer.

(21) Appl. No.: 13/331,277

(22) Filed: Dec. 20, 2011

(65) Prior Publication Data

US 2012/0153827 A1    Jun. 21, 2012

Related U.S. Application Data

(60) Provisional application No. 61/424,857, filed on Dec. 20, 2010.

(51) Int. Cl.
 *B60Q 1/14* (2006.01)
 *B60Q 1/32* (2006.01)
 *B60Q 1/30* (2006.01)

(52) U.S. Cl.
 CPC . *B60Q 1/32* (2013.01); *B60Q 1/305* (2013.01)
 USPC .......................................................... 315/77

(58) Field of Classification Search
 USPC ......... 315/76, 77, 80; 439/34, 35, 36, 92, 108
 See application file for complete search history.

(56) References Cited

U.S. PATENT DOCUMENTS

| | | | |
|---|---|---|---|
| 4,241,371 A | 12/1980 | Sage | |
| 5,030,938 A * | 7/1991 | Bondzeit | 340/431 |
| 5,521,466 A * | 5/1996 | Vincent | 315/77 |
| 5,639,246 A * | 6/1997 | Holmes | 439/35 |
| 7,893,622 B2 | 2/2011 | Chang | |
| 2003/0158640 A1* | 8/2003 | Pillar et al. | 701/33 |
| 2010/0308984 A1 | 12/2010 | Ehrlich | |
| 2011/0237090 A1 | 9/2011 | Ehrlich | |

OTHER PUBLICATIONS

Lawrence, Mark; Motorcycle Lights [online], Feb. 25, 2004; Retrieved From Internet Archive, http://web.archive.org/web/20040225084649/http://motorcycleinfo.calsci.com/Lights/html.
Radiantz, Inc.; Dual Element Circuit for Flex 5-10 LEDs [online], Dec. 15, 2005; Retrieved From Internet Archive http://web.archive.org/web/20051211211811/http://www.radiantz.com/index.html?626.html&1.
Thorstensen,Eric; Auxilliary High Mount Stop and Turn Lights; May 1, 2008; Alamo City, Nevada.
Canadian Application No. 2762700 Office Action issued on Dec. 30, 2013.

* cited by examiner

*Primary Examiner* — Minh D A
(74) *Attorney, Agent, or Firm* — Woodard, Emhardt, Moriarty, McNett & Henry LLP

(57) ABSTRACT

A lamp and lamp driver are disclosed, in which single intensity marker lamps that are desired to be flashed can be connected to a lamp driver employing an exclusive OR (XOR) logic circuit. In one application, this lamp driver is coupled to a vehicle turn function wire and marker function wire, and a plurality of marker lamps in a row can be of the same style, but one lamp can be flashed in the row of marker lamps. In some embodiments, if all of the marker lamps are on, the lamp being driven by the XOR driver circuit will flash out of sequence with the turn signal flash. If all of the marker lamps are off, the lamp being driven by the XOR driver circuit will flash in sequence with the turn signal flash. Other embodiments are disclosed.

30 Claims, 3 Drawing Sheets

EXCLUSIVE OR (XOR) LAMP DRIVER AND LAMP

CROSS-REFERENCE TO RELATED APPLICATIONS

This application claims the benefit of U.S. Application No. 61/424,857, filed Dec. 20, 2010, which is hereby incorporated by reference in its entirety.

TECHNICAL FIELD OF THE DISCLOSURE

The present disclosure generally relates to drivers for lamps and, more particularly, to a driver for a vehicular lamp.

BACKGROUND OF THE DISCLOSURE

Although the presently disclosed embodiments will find application in a wide variety of lamp applications, it is instructive to review the trailer marker lamp application. Trailer manufacturers have designed rows of marker lamps located on trailers, such as commercial semi trailers to name just one non-limiting example, for appearance. In some cases, trailer manufacturers wish to flash one or more of these marker lamps when the vehicle operator activates the turn or hazard function flashes. To enable this, dual intensity marker lamps have been developed. The low intensity (or minor) function meets the marker lamp photometric requirements, and the high intensity (or major) function is brighter. Alternating activation of the low and high intensity functions causes the marker lamp to exhibit a flashing appearance.

These dual intensity marker lamps are more expensive to manufacture, require a second part number for the customer (i.e. a part number that is different than that used for the single intensity marker lamp), and have three terminals or wires in the lamp (minor, major and ground). Typically, the design goal for such dual intensity marker lamps is as much intensity difference between the minor and major function as possible, which results in a lower intensity minor function—or a dimmer marker than a standard single intensity marker lamp. Some trailer designers have placed an entire row of marker lamps along the side of a trailer. Using a dual intensity marker lamp in such a row of single intensity marker lamps results in one lamp that does not exactly match the others in intensity, even when all are being operated with the lower intensity minor function. This results in a non-uniform, undesirable appearance.

Trailer manufacturers and designers would prefer a flashing solution that uses standard single intensity marker lamps. These single intensity marker lamps have two terminals or wires in the lamp, namely power and ground.

SUMMARY OF THE DISCLOSURE

In some of the presently disclosed embodiments, single intensity marker lamps that the trailer designer wishes to flash can be connected to a lamp driver employing an exclusive OR (XOR) circuit as disclosed herein. Using this driver, all of the marker lamps in a row can be of the same style, but one lamp can be flashed in the row of marker lamps. In some embodiments, if all of the marker lamps are on, the lamp being driven by the XOR driver circuit will flash out of sequence with the turn signal flash. If all of the marker lamps are off, the lamp being driven by the XOR driver circuit will flash in sequence with the turn signal flash.

By using the presently disclosed lamp driver embodiments, trailer manufacturers can use standard single intensity marker lamps in auxiliary lamp locations and combine the flash and marker functions in one lamp, increasing conspicuity and lowering their overall costs.

In one embodiment, a lamp driver is disclosed, comprising: a logic circuit operative to implement an exclusive or (XOR) logic function between its inputs and its output, the logic circuit comprising: a marker function input operatively coupled to a marker function wire of a vehicle; a turn function input operatively coupled to a turn function wire of said vehicle; and a lamp driver output.

In another embodiment, a lamp is disclosed, comprising: a logic circuit operative to implement an exclusive or (XOR) logic function between its inputs and its output, the logic circuit comprising: a marker function input operative to receive a marker function signal from a vehicle; a turn function input operative to receive a turn function signal from said vehicle; and a lamp driver output; and a lamp having a lamp power input operatively coupled to said lamp driver output.

Other embodiments are also disclosed.

DETAILED DESCRIPTION OF THE VARIOUS EMBODIMENTS

Figure 1:
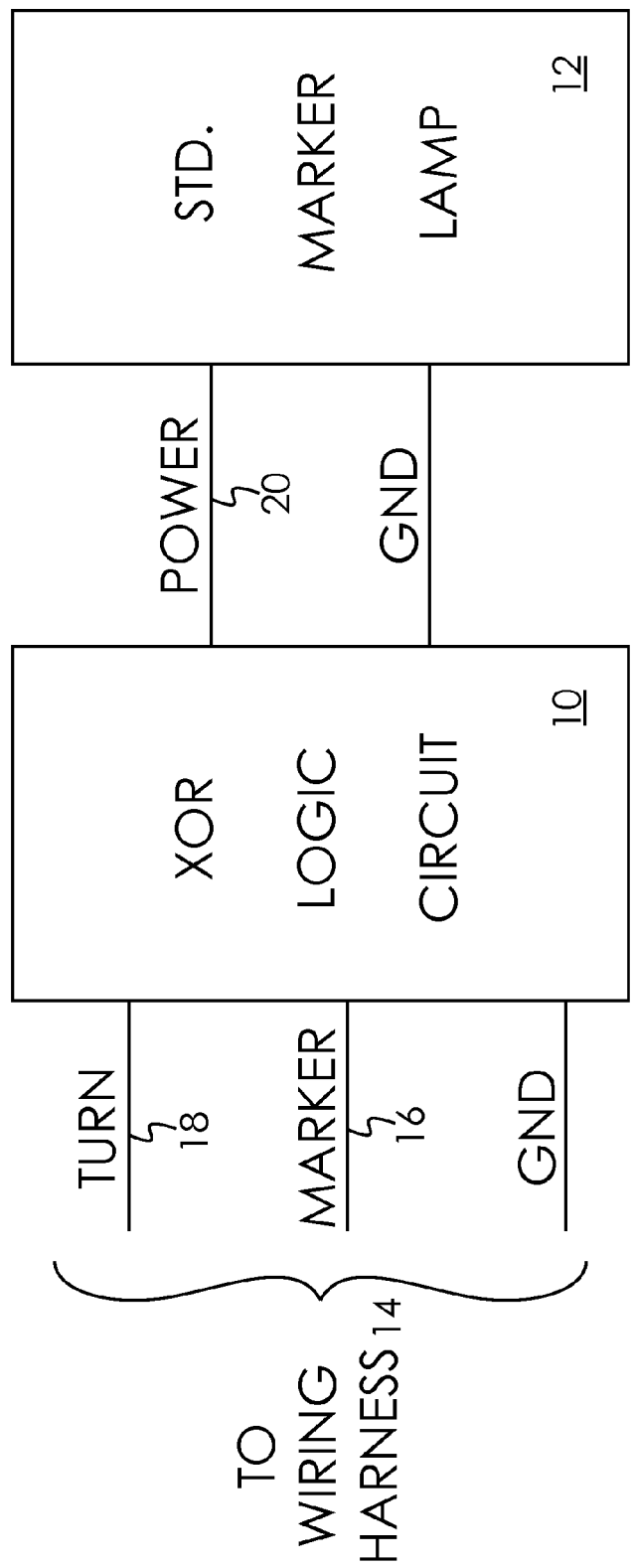
FIG. 1 is a schematic block diagram illustrating one embodiment of the present disclosure.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

An exclusive OR (XOR) logic circuit provides a voltage to its output if any one of the inputs receives a voltage. If the inputs to the XOR circuit are all high or all low, there is no output. In one embodiment, single intensity marker lamps that the trailer designer wishes to flash can be connected to a lamp driver employing an exclusive OR (XOR) circuit as disclosed herein. Using this driver, all of the marker lamps in a row can be of the same style, but one lamp can be flashed in the row of marker lamps. In some embodiments, if all of the marker lamps are on, the lamp being driven by the XOR driver circuit will flash out of sequence with the turn signal flash. If all of the marker lamps are off, the lamp being driven by the XOR driver circuit will flash in sequence with the turn signal flash.

If an XOR logic circuit 10 is placed between a standard single intensity marker lamp 12 and the vehicular wiring harness 14 that drives the marker lamp 12, as shown in FIG. 1, such that the marker function wire 16 of the vehicular wiring harness 14 and the turn function wire 18 of the vehicular wiring harness 14 are both applied as inputs to the XOR logic circuit 10, the standard marker lamp 12 can be connected to the output 20 of the XOR logic circuit 10 and operate per the truth table shown in Table 1 below.

TABLE 1

XOR Logic Circuit Truth Table

| Turn Function | Marker Function | Lamp Operation |
|---|---|---|
| 0 (no voltage) | 0 (no voltage) | Off (no light) |
| 0 (no voltage) | 1 (voltage) | On (light) |
| 1 (voltage) | 0 (no voltage) | On (light) |
| 1 (voltage) | 1 (voltage) | Off (no light) |

When neither the marker function wire 16 nor turn function wire 18 is active (i.e., no operating voltage is present on either wire) the lamp 12 is off. When both the marker function wire 16 and turn function wire 18 are active (i.e., an operating voltage is present on both wires), the lamp 12 is off. If either (but not both) of the marker function wire 16 or turn function wire 18 are active (i.e., an operating voltage is present on one but not both of the wires), the lamp 12 is on.

To describe the operation another way, if the marker function wire 16 is off, the lamp 12 will flash in sequence with the other lamps flashing on the trailer. If the marker function wire 16 is on, the lamp 12 will flash out of sequence with the other lamps flashing on the trailer.

The XOR logic circuit 10 may be located in any convenient location, inside a lamp or outside the lamp.

Figure 2:
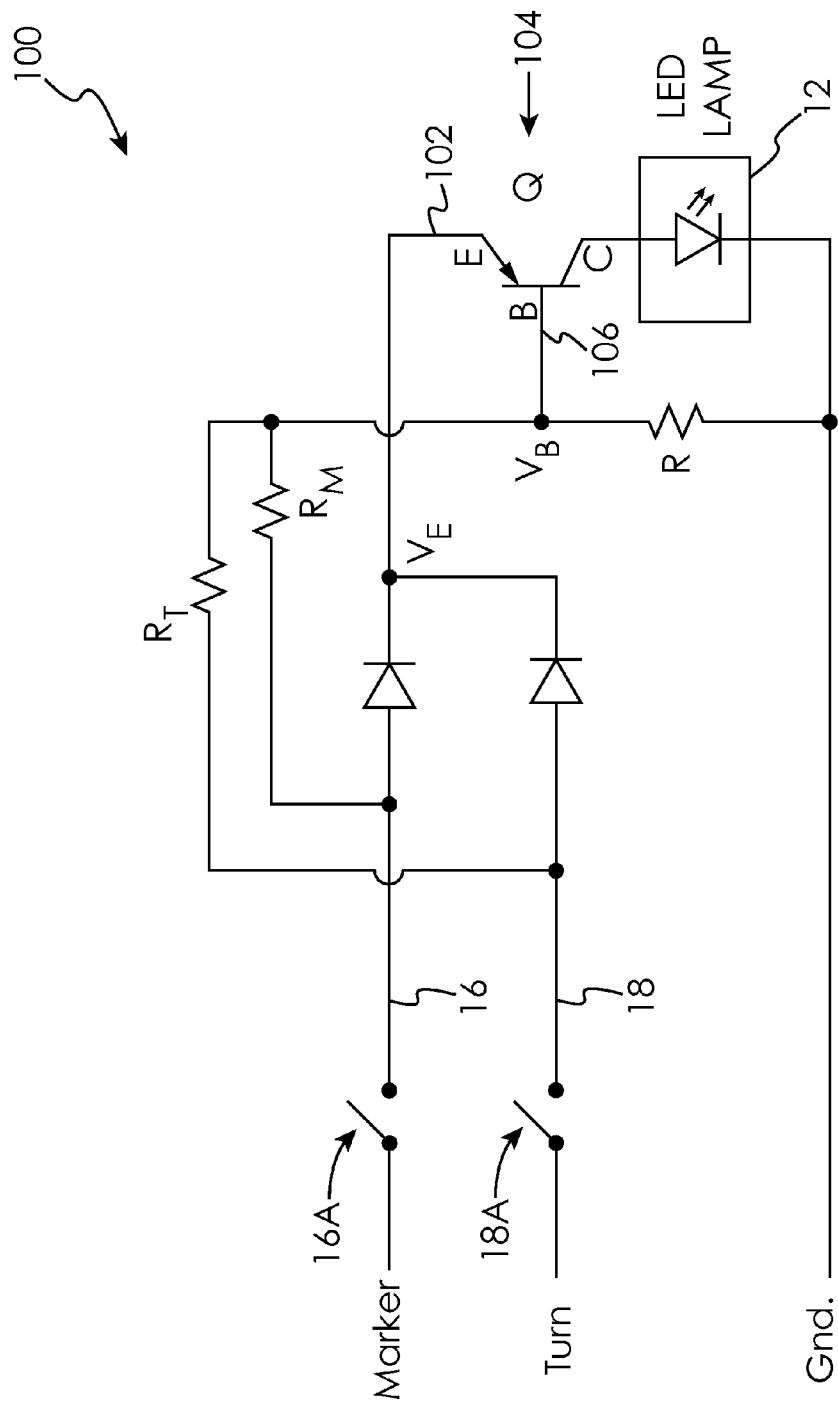
FIG. 2 is a schematic electrical circuit diagram illustrating one embodiment of the present disclosure.

FIG. 2 illustrates a schematic electrical circuit diagram of an XOR logic circuit 100 of one embodiment of the present disclosure. The circuit in FIG. 2 operates as follows. When both marker function wire 16 and turn function wire 18 are open (i.e. switches 16A and 18A are open and no operating voltage is present), there is no voltage to the circuit 100. No voltage is available to power the lamp 12 and it is off. If either switch 16A or 18A is closed, there is a voltage present at the emitter 102 of the transistor 104. There is also a voltage at the base 106 of the transistor 104 that is equivalent to the voltage divider RT or RM, and R. If the transistor 104 is a PNP bipolar transistor, the resistances must be selected so that the voltage at the base 106 of the transistor 104 is more than 0.6V lower than the voltage at the emitter 102. This assures that the transistor 104 is turned on, and that current flows through and turns on the lamp 12. With this design, if either of the marker function wire 16 or turn function wire 18 supplies an appropriate level of voltage, the lamp 12 will turn on. If both the marker function wire 16 and turn function wire 18 are on (i.e., supply an appropriate level of voltage), there is still voltage to the emitter 102 of the transistor 104. However, now the voltage at the base 106 is set by the voltage divider from the parallel connection of RT and RM and R as shown. If the resistors RT and RM are selected correctly, the base 106 of the transistor 104 will be less than 0.6V lower than the emitter 102 and the transistor 104 will not be turned on. With this design, if both of the marker function wire 16 and turn function wire 18 supply an appropriate level of voltage, the transistor 104 will be off and the lamp 12 will not light. Note that transistor 104 can be any type of switching device that has a switching control input that is operative to selectively conductively couple a power input terminal to an output terminal, such as a metal oxide semiconductor field effect transistor (MOSFET), or other type of transistor or switching device, and the resistances selected so that the switching control input voltage will turn on and off at the proper inputs.

Figure 3:
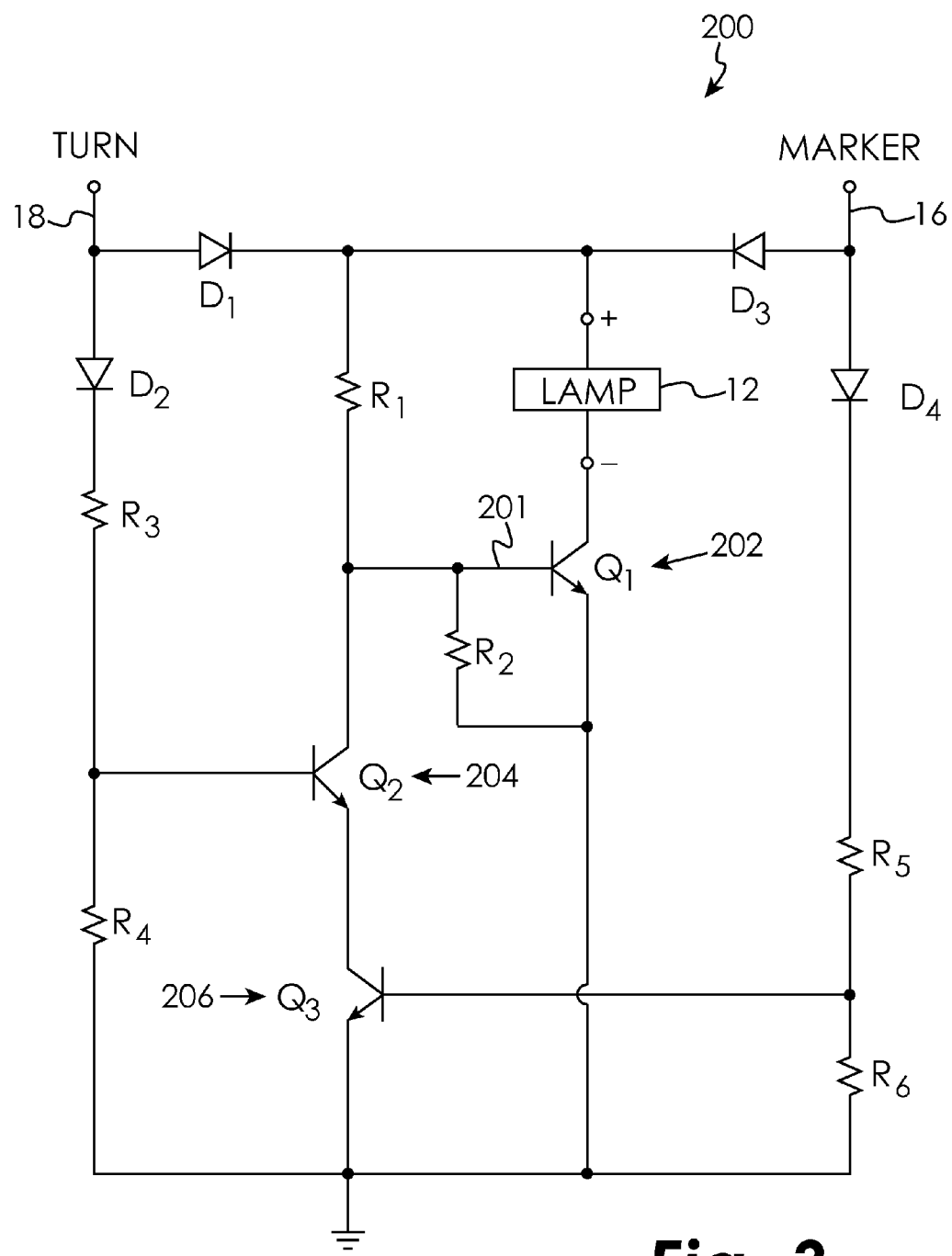
FIG. 3 is a schematic electrical circuit diagram illustrating one embodiment of the present disclosure.

FIG. 3 illustrates a schematic electrical circuit diagram of an XOR logic circuit 200 of another embodiment of the present disclosure. FIG. 3 operates as follows. If neither marker function wire 16 nor turn function wire 18 are on, there is no power to the circuit and the lamp 12 is off. If there is voltage applied to either or both the marker function wire 16 or turn function wire 18, there is power applied to the lamp 12 and to the base 201 of transistor 202 via one or both rectifier diodes. There are two transistors, 204 and 206, connected in series to the base 201 of transistor 202 as shown. If there is power applied to only one input 16 or 18, only one of the transistors 204 and 206 are on, the other transistor is off and transistor 202 remains on (since its base 201 is not grounded through the transistors 204 and 206, one of which is off). When transistor 202 remains on and there is power to the lamp 12, the lamp 12 will be illuminated. If power is applied to both inputs 16 and 18, both of the transistors 204 and 206 will be on. Since transistors 204 and 206 are connected in series to ground, when both transistors 204 and 206 are on, the voltage at the base 201 of transistor 202 will be less than 0.6V and transistor 202 is off. If transistor 202 is off, no current can flow through the lamp 12 and the lamp 12 will be turned off. It will be appreciated by those skilled in the art that in the embodiments of both FIGS. 2 and 3, the lamp 12 may be placed on either side of the controlling switching device 104, 202 (i.e., high side control or low side control). It shall be further understood that resistor R2 as shown in FIG. 3 may be optionally omitted, depending on the needs of the particular application.

TABLE 2

XOR Logic Circuit Truth Table for FIG. 3

| Turn Function 18 | Marker Function 16 | Q1 | Q2 | Q3 | Lamp Operation |
|---|---|---|---|---|---|
| 0 (no voltage) | 0 (no voltage) | Off | Off | Off | Off (no light) |
| 0 (no voltage) | 1 (voltage) | On | Off | On | On (light) |
| 1 (voltage) | 0 (no voltage) | On | On | Off | On (light) |
| 1 (voltage) | 1 (voltage) | Off | On | On | Off (no light) |

By using the presently disclosed lamp driver embodiments, trailer manufacturers can use standard single intensity marker lamps in auxiliary lamp locations and combine the flash and marker functions in one lamp, increasing conspicuity and lowering their overall costs.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A lamp driver, comprising:
  a logic circuit operative to implement an exclusive or (XOR) logic function between its inputs and its output, the logic circuit comprising:
    a marker function input operatively coupled to a marker function wire of a vehicle;
    a turn function input operatively coupled to a turn function wire of said vehicle;
    a lamp driver output;
    a first diode having a first anode and a first cathode, the first anode operatively connected to the marker function input;
    a second diode having a second anode and a second cathode, the second anode operatively connected to the turn function input, the second cathode operatively connected to the first cathode; and
    a first switching device configured to supply power to the lamp driver output through at least one of the diodes if either the turn input or marker input is high, the first switching device further configured to block power to the lamp driver output if both the turn and marker inputs are high.

2. The lamp driver of claim 1, wherein the marker function wire and the turn function wire form a portion of a wiring harness of said vehicle.

3. The lamp driver of claim 1, further comprising:
a lamp having a lamp power input operatively coupled to said lamp driver output.

4. The lamp driver of claim 3, wherein said lamp comprises a single intensity marker lamp.

5. The lamp driver of claim 3, wherein said logic circuit and said lamp are disposed within a single housing.

6. The lamp driver of claim 1, further comprising:
a logic circuit ground input operatively coupled to a vehicle ground; and
a logic circuit ground output.

7. The lamp driver of claim 6, further comprising:
a lamp having a lamp power input operatively coupled to said lamp driver output and a lamp ground operatively coupled to said logic circuit ground output.

8. The lamp driver of claim 7, wherein said lamp comprises a single intensity marker lamp.

9. The lamp driver of claim 7, wherein said logic circuit and said lamp are disposed within a single housing.

10. The lamp driver of claim 6, wherein said logic circuit comprises:
a first resistor having a first end operatively coupled to the turn function input and a second end; and
a second resistor having a third end operatively coupled to the marker function input and a fourth end operatively coupled to the second end of the first resistor;
wherein the first switching device has a first switching control input operatively coupled to the second end of the first resistor, a first power input operatively coupled to the first and second cathodes, and a first switching device output operatively coupled to the lamp driver output.

11. The lamp driver of claim 10, further comprising:
a third resistor having a fifth end operatively coupled to the first switching control input, and a sixth end operatively coupled to the logic circuit ground input.

12. The lamp driver of claim 10, wherein the first switching device comprises a bipolar transistor, the first switching control input comprises a base of the bipolar transistor, the first power input comprises an emitter of the bipolar transistor, and the first switching device output comprises a collector of the bipolar transistor.

13. The lamp driver of claim 10, wherein the first switching device comprises a field effect transistor, the first switching control input comprises a gate of the field effect transistor, the first power input comprises source of the field effect transistor, and the first switching device output comprises a drain of the field effect transistor.

14. The lamp driver of claim 13, wherein the field effect transistor comprises a metal oxide semiconductor field effect transistor (MOSFET).

15. The lamp driver of claim 6, wherein said logic circuit comprises:
a first resistor having a first end and a second end, the first end operatively coupled to the first and second cathodes, the first switching device having a first switching control input operatively coupled to the second end of the first resistor, a first power input operatively coupled to the logic circuit ground output, and a first switching device output operatively coupled to the logic circuit ground input;
a second resistor having a third end operatively coupled to the turn function input and a fourth end;
a third resistor having a fifth end operatively coupled to the fourth end of the third resistor and an sixth end operatively coupled to the logic circuit ground input;
a second switching device having a second switching control input operatively coupled to the fourth end of the second resistor, a second power input operatively coupled to the second end of the first resistor, and a second switching device output;
a fourth resistor having a seventh end operatively coupled to the marker function input and an eighth end;
a fifth resistor having an ninth end operatively coupled to the eighth end of the fourth resistor and a tenth end operatively coupled to the logic circuit ground input; and
a third switching device having a third switching control input operatively coupled to the eighth end of the fourth resistor, a third power input operatively coupled to the second switching device output, and a third switching device output operatively coupled to the logic circuit ground input;
wherein the lamp driver output is operatively coupled to the first and second cathodes.

16. The lamp driver of claim 6, wherein said logic circuit comprises:
a first resistor having a first end and a second end, the first end operatively coupled to the first and second cathodes, the first switching device having a first switching control input operatively coupled to the second end of the first resistor, a first power input operatively coupled to the logic circuit ground output, and a first switching device output operatively coupled to the logic circuit ground input.

17. The lamp driver of claim 6, wherein said logic circuit further comprises:
a second and third switching device connected in series between the second end of the first resistor and the logic circuit ground input, the second switching device configured to pass current when the marker function input is high and block current when the marker function input is low, the third switching device configured to pass current when the turn function input is high and block current when the turn function input is low.

18. A lamp, comprising:
a logic circuit operative to implement an exclusive or (XOR) logic function between its inputs and its output, the logic circuit comprising:
a marker function input operative to receive a marker function signal from a vehicle;
a turn function input operative to receive a turn function signal from said vehicle;
a lamp driver output;
a lamp having a lamp power input operatively coupled to said lamp driver output;
and
a first diode having a first anode and a first cathode, the first anode operatively connected to the marker function input;
a second diode having a second anode and a second cathode, the second anode operatively connected to the turn function input, the second cathode operatively connected to the first cathode; and
a first switching device configured to supply power to the lamp driver output through at least one of the diodes if either the turn input or marker input is high, the first switching device further configured to block power to the lamp driver output if both the turn and marker inputs are high.

19. The lamp of claim 18, further comprising:
a single housing containing the logic circuit and the lamp.

20. The lamp of claim 18, wherein the marker function input and the turn function input are operatively coupled to a wiring harness of said vehicle.

21. The lamp of claim 18, wherein said lamp comprises a single intensity marker lamp.

22. The lamp of claim 18, further comprising:
a logic circuit ground input; and
a logic circuit ground output.

23. The lamp of claim 22, wherein the logic circuit ground input is operatively coupled to a vehicle ground.

24. The lamp of claim 23, further comprising:
a lamp ground operatively coupled to said logic circuit ground output.

25. The lamp of claim 23, wherein said logic circuit comprises:
a first resistor having a first end operatively coupled to the first and second cathodes,
the first switching device having a first switching control input operatively coupled to the second end of the first resistor, a first power input operatively coupled to the logic circuit ground output, and a first switching device output operatively coupled to the logic circuit ground input;
a second resistor having a third end operatively coupled to the turn function input and a fourth end;
a third resistor having a fifth end operatively coupled to the fourth end of the second resistor and an sixth end operatively coupled to the logic circuit ground input;
a second switching device having a second switching control input operatively coupled to the fourth end of the second resistor, a second power input operatively coupled to the second end of the first resistor, and a second switching device output;
a fourth resistor having a seventh end operatively coupled to the marker function input and an eighth end;
a fifth resistor having an ninth end operatively coupled to the eighth end of the fourth resistor and a tenth end operatively coupled to the logic circuit ground input; and
a third switching device having a third switching control input operatively coupled to the eighth end of the fourth resistor, a third power input operatively coupled to the second switching device output, and a third switching device output operatively coupled to the ground input;
wherein the lamp driver output is operatively coupled to the first and second cathodes.

26. The lamp of claim 18, wherein said logic circuit comprises:
a first resistor having a first end operatively coupled to the turn function input and a second end; and
a second resistor having a third end operatively coupled to the first and second cathodes and a fourth end operatively coupled to the second end of the first resistor;
wherein the first switching device has a first switching control input operatively coupled to the second end of the first resistor, a first power input operatively coupled to the first and second cathodes, and a first switching device output operatively coupled to the lamp driver output.

27. The lamp of claim 26, further comprising:
a third resistor having a fifth end operatively coupled to the first switching control input, and a sixth end operatively coupled to the logic circuit ground input.

28. The lamp of claim 26, wherein the first switching device comprises a bipolar transistor, the first switching control input comprises a base of the bipolar transistor, the first power input comprises an emitter of the bipolar transistor, and the first switching device output comprises a collector of the bipolar transistor.

29. The lamp of claim 26, wherein the first switching device comprises a field effect transistor, the first switching control input comprises a gate of the field effect transistor, the first power input comprises source of the field effect transistor, and the first switching device output comprises a drain of the field effect transistor.

30. The lamp of claim 29, wherein the field effect transistor comprises a metal oxide semiconductor field effect transistor (MOSFET).

* * * * *